United States Patent [19]
McInnes et al.

[11] Patent Number: 5,924,547
[45] Date of Patent: Jul. 20, 1999

[54] LAYER PACKAGING AND ORIENTATION OF FLEXIBLE ARTICLES

[75] Inventors: Ian James McInnes, Victoria, Australia; Stephen Owen, Bourn, United Kingdom; Petr Baum, Victoria, Australia

[73] Assignee: Pacific Dunlop Limited, Melbourne, Australia

[21] Appl. No.: 08/879,459

[22] Filed: Jun. 20, 1997

[51] Int. Cl.$^6$ ................................................ B65G 47/248
[52] U.S. Cl. .......................... 198/407; 198/408; 198/409; 414/757
[58] Field of Search .................................... 198/406, 407, 198/408, 409; 271/175; 414/757

[56] References Cited

U.S. PATENT DOCUMENTS 2,391,691  12/1945  Engels .................................. 198/408 X

*Primary Examiner*—Janice L. Krizek
*Attorney, Agent, or Firm*—Gardner, Carton & Douglas

[57] ABSTRACT

An apparatus for presenting a flexible article, longer than it is wider, in a predetermined orientation which has an orientation for tumbling the article generally about one direction while retaining the article so that it can rotate about another direction while it is being tumbled. The retention mechanism on the apparatus includes a retention face and is moveable between a first position in which the retention face is disposed to receive the article generally downwardly from the orientation head while it is being tumbled thereby, and a second position displaced from the first. Additionally, when the article is received on the retention face, it can be detected if it is correctly orientated on the retention face. In response to this detection, the retention mechanism moves to the second position and the article is received in a predetermined orientation from the retention face at the second position of the retention mechanism.

29 Claims, 6 Drawing Sheets

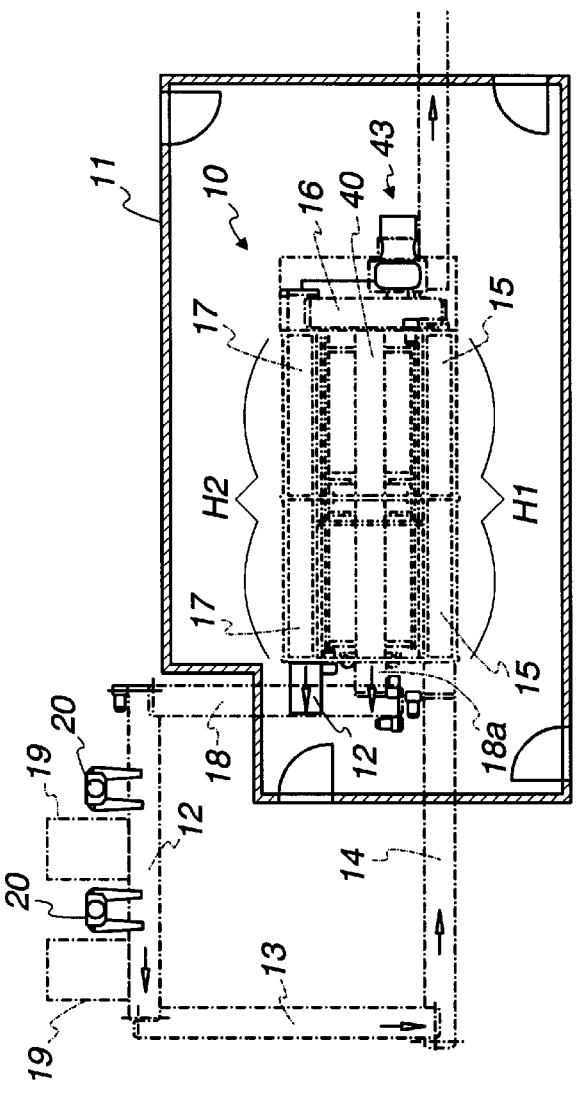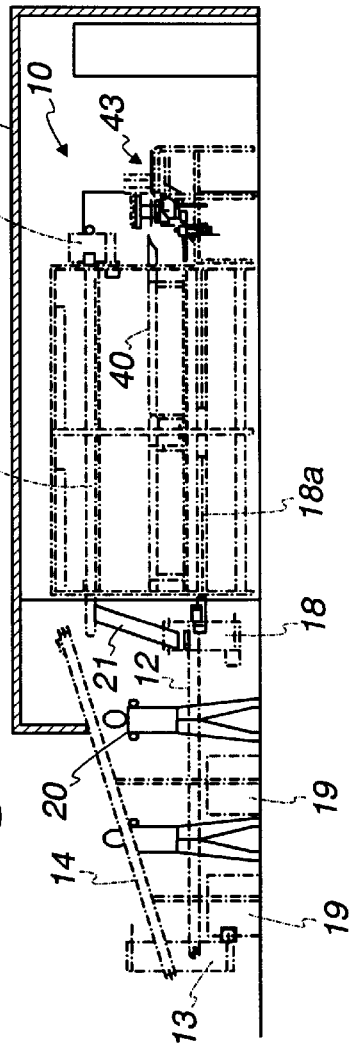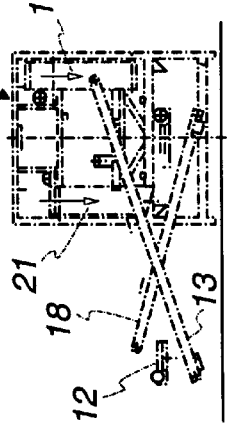
Fig. 1
Fig. 2
Fig. 3

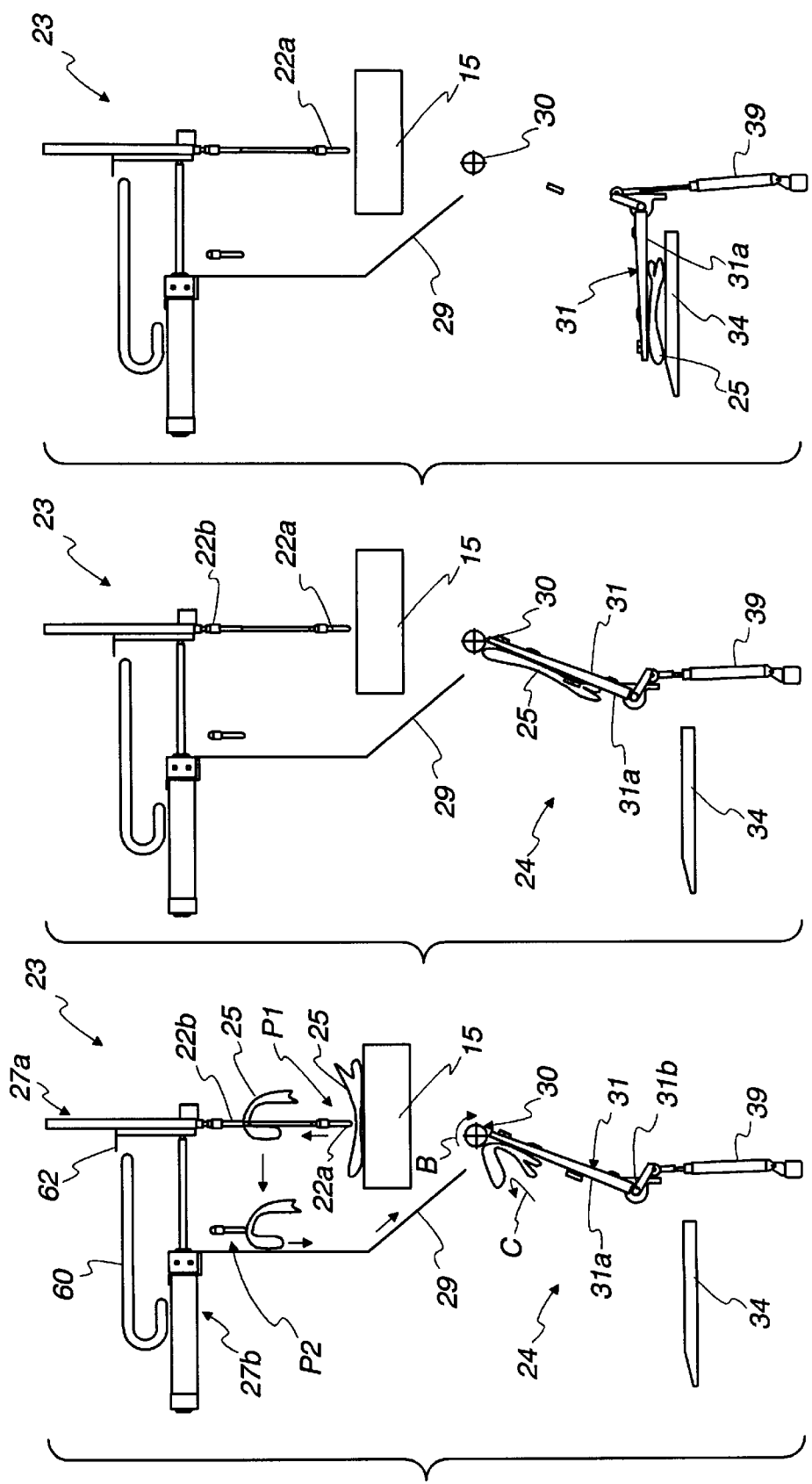

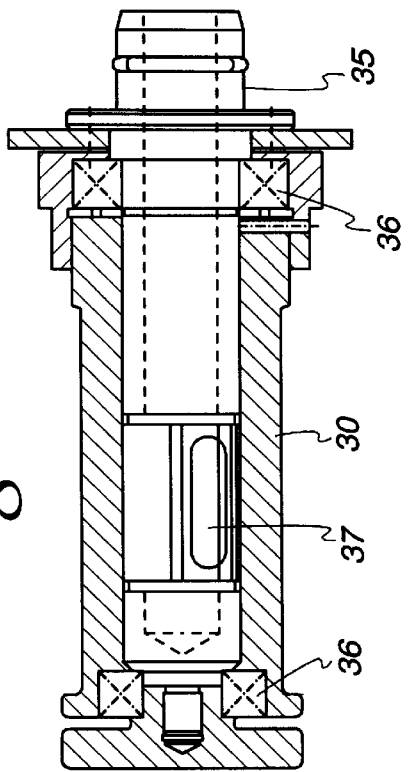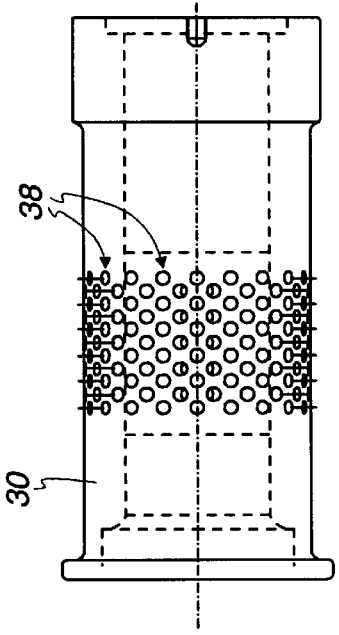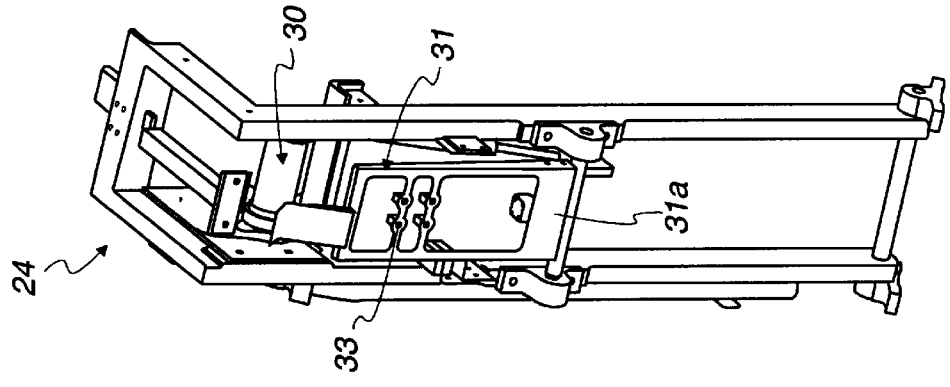

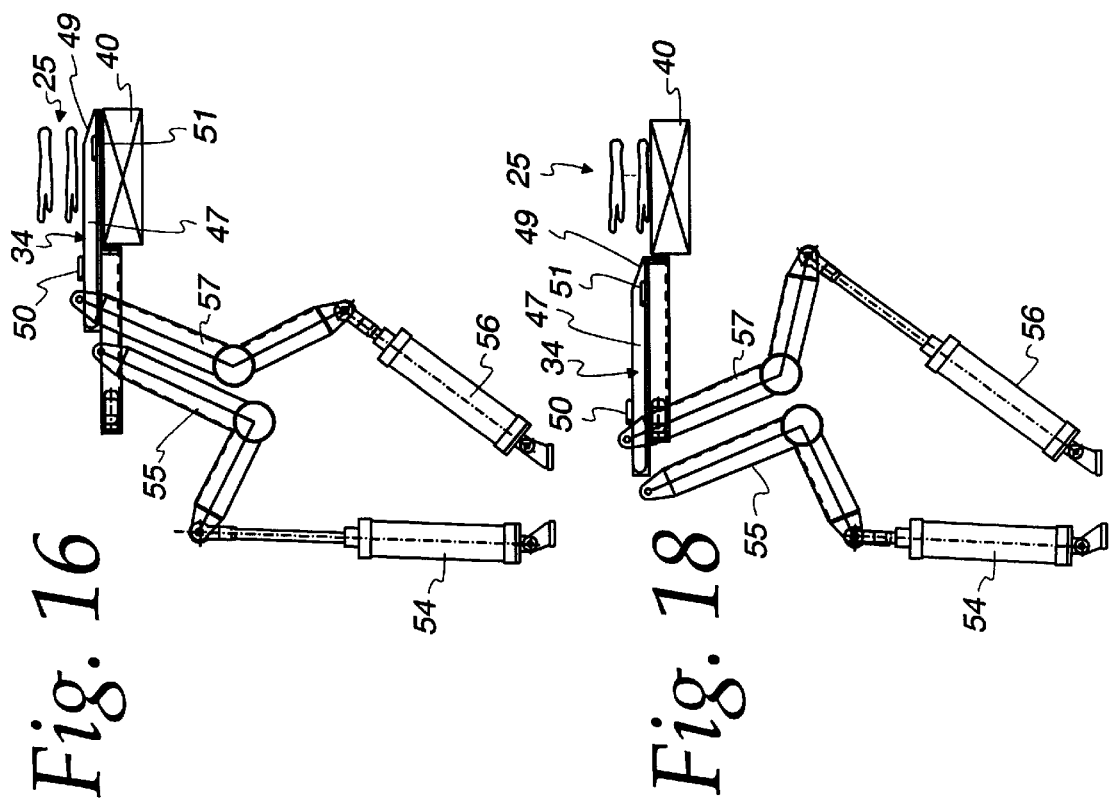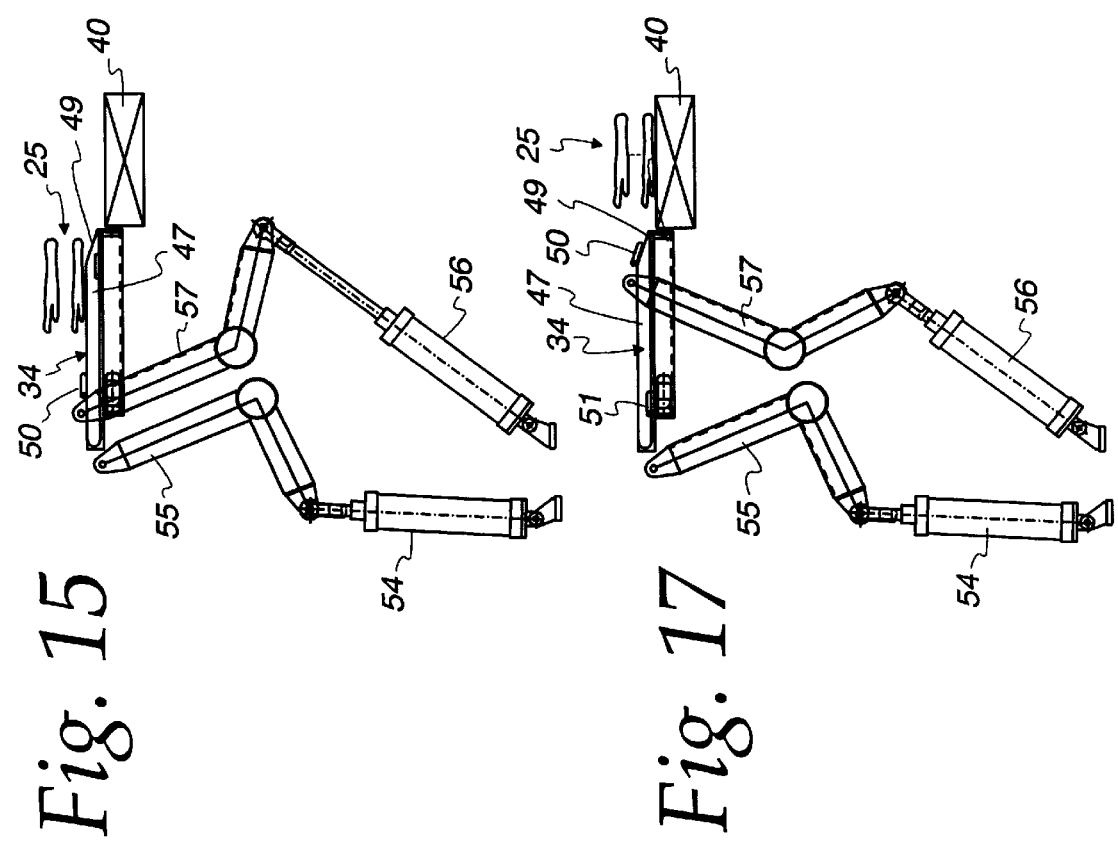

LAYER PACKAGING AND ORIENTATION OF FLEXIBLE ARTICLES

FIELD OF THE INVENTION

The present invention relates in one broad application to the layer packaging of articles, particularly non-uniformly shaped flexible articles such as, for example, disposable gloves as used in the medical profession for examination purposes and in industry for clean room conditions and protection from harmful materials.

In respective other aspects, the invention is concerned with the presentation of flexible articles in a predetermined orientation, and with the stacking of such articles. Some aspects of the invention are especially useful in handling flexible articles that are longer than they are wider, or vice versa. Whilst the invention will be described in relation to the packaging of disposable gloves it should be understood that it could be readily used for packaging other articles.

BACKGROUND ART

Conventionally, gloves of the above-mentioned kind are packaged into boxes which often feature a tear-out slot, similar to tissue boxes, through which gloves can be removed. The processes used in manufacture of the gloves typically result in lack of orientation of the final product, which consequently is presented to a packaging room in a random orientation. As a result, the gloves are packaged in random unoriented fashion in the boxes via the end of the box which is subsequently sealed. Unfortunately, this form of packaging results in the gloves often being entwined and/or screwed-up, and therefore difficult to remove through the slot. Furthermore, the gloves when withdrawn from the box are poorly presented.

The random orientation of the gloves in the boxes could be eliminated if they were manually oriented and layer packed, but this would usually be considered to be a prohibitively costly procedure.

It is known to orient condoms for packaging by blowing them along pneumatic tubes. Although this approach has shown some promise in tests with gloves, it was found not to be reliable for those types of gloves without a peripheral head at their mouth.

SUMMARY OF THE INVENTION

Accordingly, it is an object of this invention to provide a machine which, at least in one application, facilitates layer packaging of flexible articles at least to the extent of providing orientation of the articles.

In a first aspect, the invention provides apparatus for presenting a flexible article, longer than it is wider, in a predetermined orientation. The apparatus includes an orientation head including means to tumble an article generally about one direction while retaining the article so that it can rotate about another direction while it is being tumbled, and retention means including a retention face, moveable between a first position in which the retention face is disposed to receive an article generally downwardly from the orientation head while it is being tumbled thereby, and a second position displaced from the first. Means is provided to detect when the article received on the retention face is correctly oriented on the retention face, in response to which detection the retention means moves to its second position. The apparatus further includes means to receive an article in a predetermined orientation from the retention face at said second position of the retention means.

The apparatus preferably further includes an input conveyor on which in use the articles are randomly oriented and picker means for selecting single said articles in turn from the input conveyor, and delivering the selected articles in turn to the orientation head.

The retention face may be defined by a flipper plate comprising an open frame. The apparatus advantageously further includes means to temporarily hold the article received from the orientation head on the retention face. This means may include vacuum suction means.

The means to receive an article from the retention face can include a pecking conveyor and an output conveyor.

In a second aspect of the invention, there is provided a machine for facilitating layer packaging of flexible articles, including:

an orientation head;

picker means for selecting single articles, in turn, from an input conveyor and delivering said articles to said orientation head, said orientation head including a flipper plate and means to retain and tumble an article until said article is correctly oriented on the face of said flipper plate;

means to hold said article temporarily on said face; and means to displace said flipper plate whereby said article is placed immediately above a pecking conveyor and released from said flipper plate to lie in a flat, oriented position, on said pecking conveyor.

The article may be non-uniformly shaped articles, such as rubber gloves.

The machine preferably further includes an output conveyor which receives the articles from the pecking conveyor in a stack and transports the stack to a hopper wherein the stack is prepared for packaging into a box.

Preferably, the orientation head includes a perforated orientation roller adapted to have a vacuum on the face of a sector of the roller, the vacuum being maintained in the same angular position as the roller rotates and said other direction being substantially radial with respect to the roller, whereby when an article is dropped onto said roller it is held by the rotating roller and tumbled about said one direction while rotating about said other direction until one end is held against the roller by the vacuum and the article depends downwardly therefrom. The retention means, in the first position, preferably extends downwardly from under the roller with the retention face at a slight angle to the vertical whereby the article rests in a downwardly oriented position against the retention face, and the detection means may then include sensor means to determine when said article is fully extended.

The picker means advantageously includes a picker nozzle and a chute, and the picker nozzle is mounted on the end of a vacuum tube and adapted for movement to a position above and in close proximity to the input conveyor whereby a vacuum applied to the nozzle causes an article to be picked-up from the input conveyor and retained by the nozzle, the nozzle being adapted for further movement to a position clear of the input conveyor and over the cute such that removal of the nozzle vacuum causes the article to be released by the nozzle and dropped into or onto the chute, which is positioned to deliver an article therein to the orientation head.

Preferably, the machine comprises a plurality of picker nozzles and associated orientation heads arranged in spaced relation along the input conveyor.

Each flipper plate is preferably pivotally mounted in the machine, which further includes means to displace the flipper plate comprising a pneumatic actuator for pivoting the flipper plate from said first position to said second position wherein the retention face is substantially parallel to a surface of the means to receive an article from the retention face.

The input conveyor is conveniently part of a recirculation belt conveyor system onto which articles are loaded from bulk and on which articles not selected on a pass through the machine, are recirculated.

Preferably, the perforated orientation roller is mounted to rotate on a stationary shaft, the shaft having an axial bore and an elongate radial slot extending from the bore through the surface of the shaft whereby vacuum applied to the bore is applied through the perforations of the roller as they align with the slot during rotation of the roller.

Preferably, the pecking conveyor is adapted to move transversely of the longitudinal direction of the output conveyor, and has a surface adapted to move transversely in order to deposit the sub-stacks of the articles deposited on the pecking conveyor, onto the output conveyor by a combination of transverse movement of the pecking conveyor and transverse movement of the surface thereof.

In an embodiment a plurality of orientation units, each including an orientation head and a retention means is arranged with respect to the pecking conveyor to form respective sub-stacks of the articles on the pecking conveyor in which sub-stacks the articles have an orientation predetermined by the orientation units, and the pecking conveyor is arranged and is relatively operable to feed the sub-stacks onto the output conveyor for delivery thereby to a packaging machine.

In a third aspect, the invention provides apparatus for stacking flexible articles for packaging, including a pecking conveyor, an output conveyor, and a plurality of orientation units arranged with respect to the pecking conveyor to form respective sub-stacks of the articles on the pecking conveyor in which sub-stacks the articles have an orientation predetermined by the orientation units, and wherein the pecking conveyor is arranged and is relatively operable to feed the sub-stacks onto the output conveyor for delivery thereby to a packaging machine.

In an embodiment of the third aspect of the invention, there is a pair of the pecking conveyors and associated orientation units, disposed to feed a shared output conveyor from opposite sides of the output conveyor, so as to balance any preferred direction of orientation of the articles in the sub-stacks.

BRIEF DESCRIPTION OF THE DRAWINGS

In order that the invention may be more readily understood, one particular embodiment will now be described with reference to the accompanying drawings wherein:

FIG. 1 is a plan view, with some parts omitted for clarity, of a machine according to an embodiment of the invention showing the general layout of the machine, and also depicting the recirculation conveyor belt system;

FIG. 2 is a side elevation of the machine shown in FIG. 1;

FIG. 3 is an end elevation of the machine of FIG. 1;

FIG. 5 is a typical schematic cross-sectional view of the main part of the machine depicted FIG 4, showing the components that determine the vertical travel of a glove from when it is piked up by a vacuum picker to when it lies on a pecking conveyor;

FIGS. 6 and 7 are two further views similar to FIG. 5 respectively depicting a glove oriented on the flipper plate and laid onto the pecking conveyor;

FIG. 8 is a perspective view of the orientation head and flipper plate of the machine in FIG. 4;

FIG. 9 is a longitudinal sectional view of the roller assembly of the orientation head of FIG. 8;

FIG. 10 is a transverse sectional view of an orientation roller of the assembly shown in FIG. 9;

FIG. 11 is a front elevation of the roller of FIGS. 9 and 10;

FIGS. 15 to 18 show schematically in four views the operation of one of the pecking conveyors of the machine.

Figure 4:
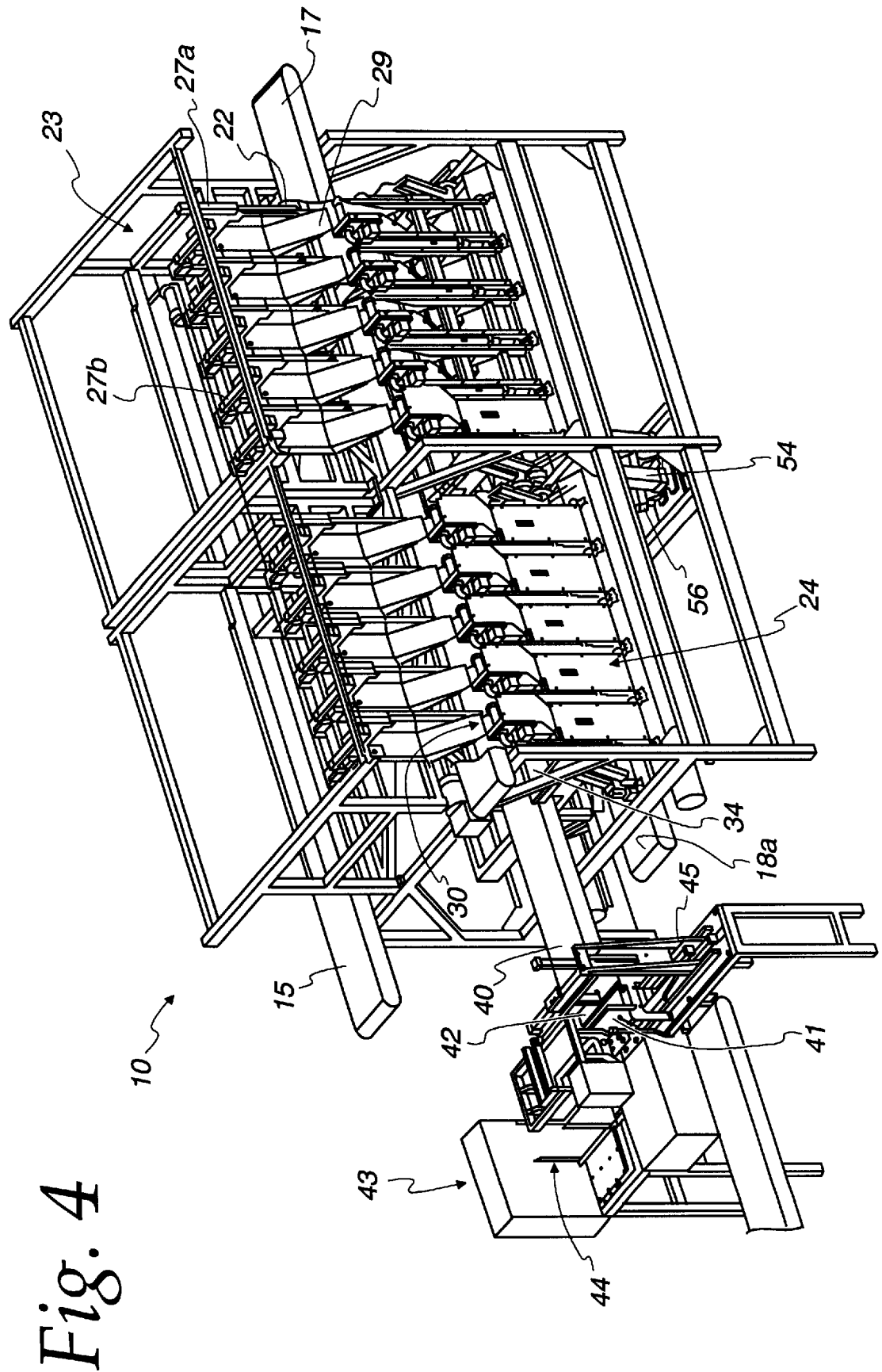
FIG. 4 is a perspective view of the main part of the machine, again with some parts omitted for clarity.

For the sake of the clarity of the drawings, certain features of the machine which are not essential to the invention are not shown. For example, optical sensors and pneumatic controls of the actuation of some parts of the machine and drive motors for conveyors are not shown. Any parts not shown or described are part of the general knowledge in the art and it is within the competence of any skilled artisan to understand the need, location and construction of such parts. Where the machine includes multiples of particular units, the drawings often only show one or a few, for enhanced clarity.

DESCRIPTION OF PREFERRED EMBODIMENT

Referring firstly to FIGS. 1, 2 and 3 the machine generally referenced 10 is housed in room 11 in order to segregate noise and other distractions of the machine operation. A conveyor system in the form of a number of belt conveyors 12 to 18 provides an input and recirculation system whereby gloves are delivered into the machine and, if not selected as they pass through the machine, are recirculated for selection on a further occasion or occasions. The gloves are manually loaded from bulk containers 19 onto a first conveyor 12 by operators 20 and are elevated by conveyors 13,14 into room 11 to input conveyor 15 which passes along one side through the machine. A transfer conveyor 16 transfers gloves not selected from the conveyor 15 to a further input conveyor 17 which runs through the machine on the opposite side to the conveyor 15. Gloves not selected from the conveyor 17 are transferred down chute 21 out of room 11 and transported by conveyor 18 back to the first conveyor 12, and are thereby recirculated through the machine. The machine also includes an underside chute and conveyor system including conveyor 18*a* for collecting dropped or falling gloves and recirculating them via conveyor 18.

Gloves are singulated (selected singularly) from the conveyors 15 and 17 by a series of picker nozzles which will be described in more detail hereinbelow. The machine 10 has twenty singulation heads or picker units 23 each having a pair of picker nozzles 22. Ten of the singulation heads are shown in FIG. 4. Each singulation head 23 has a corresponding orientation head 24 therebelow, and there are therefore twenty of the orientation heads. A series of singulation heads 23 and associated orientation heads 24 are arranged along each side of the machine with ten such heads being spaced along the side of the machine in position H1 and ten such heads being spaced along the opposite side of the machine in position H2 (FIG. 1). Each of these groups of ten are further divided into sub-groups of five which feed gloves to respective pecker conveyors 34, from which sub-stacks of the gloves are transferred to a common central output conveyor 40. Output conveyor 40 delivers the gloves to a packaging station 43 at one end of machine 10.

The operation of a singulation head 23 and an orientation head 24 will now be described with reference to FIGS. 5 to 7. As mentioned above, gloves 25 enter the machine on input conveyor 15, in a substantially continuous, randomly oriented mass which passes under ten spaced singulation heads 23 along the position H1. Each singulation head 23 includes a pair of picker nozzles 22a, 22b each mounted on the end of a vacuum shaft which provides a vacuum to the nozzle. The vacuum shaft is connected to a compressed air driven vacuum generator (not shown). When the nozzle is immediately above the mass of gloves in position P1, the vacuum causes a glove which passes under the nozzle to be collected from the conveyor 15. Each nozzle is moveable, by respective vertically and horizontally acting pneumatic actuators 27a, 27b, up and back to a retracted position P2. The vacuum shaft and pneumatic control tubes are carried by a rollable track 60 which moves with the support frame 62 of the vertically acting actuator 27a.

An electrical signal from the orientation head 24, indicating that the orientation head is ready to receive a glove, causes the vacuum at the associated retracted picker nozzle 22 to be released and the glove is dropped from position P2 down chute 29, and is thereby delivered onto a vacuum roller 30 which forms part of, and defines the top of, the orientation head 24. The construction of the vacuum or orientation roller 30 will be described in more detail below.

As one picker nozzle 22 is retracted to, and waits at, position P2, the other nozzle of that singulation head is moved to position P1 to collect another glove. This duplex operation increases the throughput of the machine.

The orientation roller 30 rotates about a horizontal axis in the direction of arrow B (FIG. 5). Vacuum on the face of the roller, being a perforated roller, drags, tumbles and rolls the glove generally about a direction parallel to the roller axis, including a contrarotation with respect to the roller indicated by arrow C (FIG. 5), until the glove is correctly positioned, laying lengthwise on the face 31a of retention means in the form of flipper plate 31 (FIG. 6). The overall orientation head is well shown in FIG. 8. The glove may be oriented either way up, that is, with either the fingers or the cuff of the glove at the top.

The vacuum or orientation roller 30 is detailed in FIGS. 9 to 11. As is evident in FIG. 9, the orientation roller 30 is mounted on a hollow vacuum shaft 35, which is a stationary shaft to which a vacuum hose (not shown) is connected. The roller 30 is rotationally mounted on the shaft by means of bearings 36 and the shaft has a radial vacuum slot 37 of an angular extent of about 20° to 30° which extends from the bore of the shaft out through the surface of the shaft. Slot 37 maintains the same angular position as the roller rotates. The slot extends only for a portion of the length of the roller and is located at a side position just below a horizontal plane through the axis of the roller and above and outwardly of face 31a of flipper plate 31. The roller 30 is perforated by means of radial holes 38 over the surface of the roller and the holes extend to the central bore of the roller.

When the roller 30 rotates on the shaft 35 and the radial holes 38 align with the vacuum slot 27, a vacuum is applied continuously to the surface of the roller 30 at the angular position of the slot 37, as is evident in FIG. 10. This vacuum at the surface of the rotating roller 30 causes a glove to be held and tumbled as described above, thereby orienting the glove against the flipper plate 31 in the required manner after a short period of time. It will be appreciated that, while tapering of chute 29 and the weight distribution of the gloves tend to impart some degree of lengthwise orientation, the gloves are generally received in a random orientation from the chute. It is thought that, because the glove is held to roller 30 in a limited zone, the glove is able to also rotate generally about a direction which is radial with respect to the roller while it is being tumbled and contrarotated generally about a direction parallel to the roller axis. The effect of gravity on the longer-than-wider shape of the glove induces the rotation about the radial direction as it biases the longer dimension towards a vertical orientation. The glove is thereby brought to an orientation downwardly as it is tumbled.

Optionally, the radial holes 38 in the roller 30 are countersunk at their outer ends. This is effective to increase the total area of application of the vacuum suction relative to the flow rate through the holes.

A sensor 32, on the flipper plate 31, senses the lower end of the glove and determines that the glove is correctly oriented by detecting its reach to an extended flat position on the flipper plate 31. Rotation of the orientation roller 30 is then stopped and a vacuum is applied to vacuum ports 33 (FIGS. 6 and 8) on the retention face 31a of the flipper plate 31, to cause the glove to be sucked against the retention face 31a of the flipper plate and held in position against the plate (FIG. 6). The flipper plate is in fact an open grid of a rigid metal frame and interposed wire, so that the glove is unlikely to stick to the plate when the vacuum is not being applied.

The flipper plate 31 is then rotated by a pneumatic actuator 39 about a pivot mounting 31b at its lower end, from its upright position (in which face 31a is at a slight angle to the vertical) to a horizontal position as shown in FIG. 7, above a pecking conveyor 34. As the plate reaches or approaches a limit position over the pecking conveyor 34, the vacuum ports 33 are deenergized and the glove is released from the flipper plate 31 and onto the pecking conveyor 34. Repetition of the procedure causes a sub-stack of gloves to be formed on the pecking conveyor 34, which at this stage is stationary. Of course, after a glove is released onto the pecking conveyor 34, the flipper plate 31 is returned to the upright position by actuator 39 for receiving a further glove released onto the orientation head 24.

FIG. 4 shows a perspective view of the machine and illustrates six orientation heads 24 of the total of twenty, and one pecking conveyor 34 of the total of four. Also shown are ten singulation heads 23 of the total number of twenty. When sufficient gloves, oriented with the fingers either to the inside or outside, have been stacked in five separate piles or sub-stacks on a pecking conveyor 34 (the machine counts the gloves as they are stacked onto the pecking conveyor), the following procedures occur:

1. The pecking conveyor 34 indexed sideways, that is, transverse to its longitudinal direction, over the top of central or output conveyor 40. The pecking conveyor 34 is then retracted to its initial position and simultaneously the surface of the conveyor is moved transversely as will be hereinafter described to deposit the sub-stacks of the gloves onto the output conveyor 40 without disrupting the stacks.

2. When a predetermined number (say 100) of gloves have been deposited onto the output conveyor 40 in ten sub-stacks, the output conveyor is actuated to deposit the layered glove sub-stacks into a glove insert hopper 41. The glove insert hopper 41 is part of packaging station 43 arranged at an end of the machine opposite to the end at which gloves are conveyed into the machine. When the gloves are deposited into hopper 41, they are compressed by a pressure plate 42, in preparation for insertion into pre-prepared boxes (not shown).

3. A box erector 44 erects a box in preparation for receiving the compressed glove pack, and an inserter frame 45 indexes forward and then retracts, thereby depositing the gloves within the box. The box erector 44 now closes the box and glues flaps of the box shut.

The machine is preferably controlled to ensure that diagonally opposite pecking conveyors 34 operate in concert, in order to balance any preferred direction of orientation of the articles in the sub-stacks. It is found that there is a tendency for more of the gloves on flipper plates 31 to be oriented fingers-down.

Figure 12:
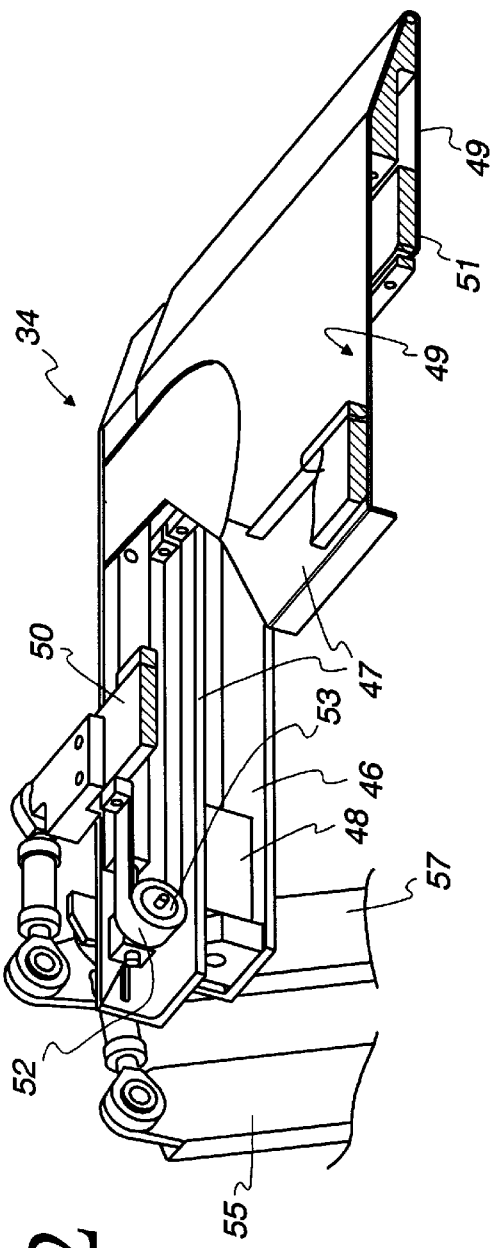
FIG. 12 is a fragmented perspective view of one of four pecking conveyors of the machine of FIG. 4.

The construction and operation of each of the four similar pecking conveyors 34 will now be described with reference to FIGS. 12 to 18. Referring firstly to FIG. 12, a pecking conveyor 34 includes a support from 46 which supports a conveyor deck 47 on linear bearings 48. The linear bearings 48 allow the deck 47 to slide from a retracted to an extended position as will become apparent. A pecking belt 49 is fitted about the conveyor deck 47 between respective drive bars 50 and 51, and a tension belt 52 is connected between the opposite sides of the respective drive bars 50 and 51, to thereby complete a closed belt loop with the pecking belt 49 about deck 47. Tension is applied to the closed belt loop be means of a tension pulley 53. A pneumatic actuator 53 is connected to the conveyor deck 47 via a crank lever 55 and is used to move the conveyor deck 47 between the retracted position at which glove sub-stacks are built up on belt 49, and the extended position over conveyor 40. A second pneumatic actuator 56 is connected to the pecking belt drive bar 50 by means of crank lever 57 and is used to control the position of the pecking belt 49 with respect to deck 47, as will be further described hereinbelow.

Figure 14:
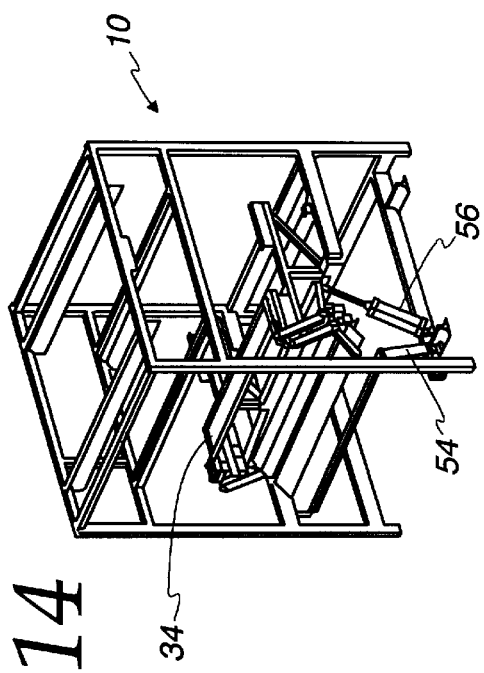
FIGS. 13 and 14 are end and perspective views, respectively, of part of the machine in FIG. 4, showing the position of one of the pecking conveyors and associated control mechanism, with other parts of the machine being omitted.
Figure 13:
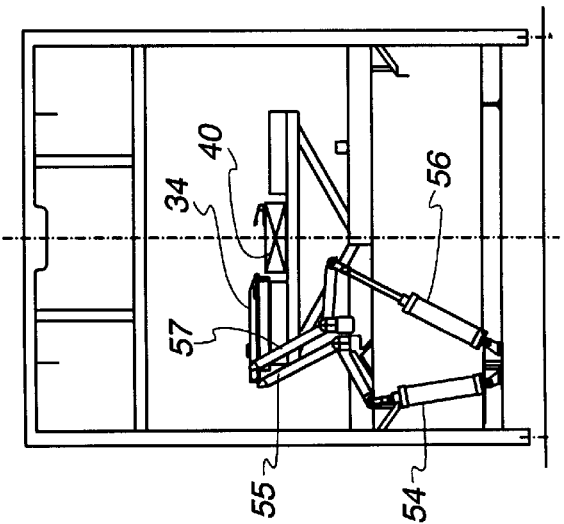

FIGS. 13 and 14 show one section of the machine frame with only one pecking conveyor and its associated actuating mechanism mounted thereon. FIGS. 15 to 18 show the various stages of motion of a pecking conveyor 34 and its associated apparatus.

The operation of each pecking conveyor 34 is as follows:

1. FIG. 15 shows the home position of the pecking conveyor 34. The gloves 25 are arranged in up to five sub-stacks on the pecking belt 49 of the pecking conveyor ready for transposing onto the output conveyor 40.

2. To progress the pecking conveyor 34 to the position shown in FIG. 16, the actuation 54 is extended, causing the conveyor deck 47 to move from the retracted position to the extended position over the output conveyor 40. This movement is achieved via the connecting crank lever 55. During this motion, the pneumatic actuator 56 and crank lever 57 adjust freely.

3. Once in the position shown in FIG. 16, the actuator 56 is locked against return extension, in turn locking the position of the drive bar 50.

4. To progress the pecking conveyor from the position shown in FIG. 16 to the position shown in FIG. 17, the actuator 54 is retracted causing the conveyor deck 47 to move to the retracted position by means of the connecting crank lever 55. During this process, because actuator 56 cannot pivot back, the drive bar 50 remains stationary, causing the surface of the conveyor, in the guise of pecking belt 49, to move relatively about deck 47. As a result, the sub-stacks of gloves are deposited, substantially without disturbance, onto the output conveyor 40 as belt 49 pulls away from under the stacks.

5. To progress to the position shown in FIG. 18, the actuator 56 is extended, driving the pecking belt 49, via the pecking belt drive bar 50, to the home position, that is, the retracted position shown in FIG. 15.

The above describes the principal features of the illustrated machine. Of course, a microprocessor or computer station for timing and controlling the synchronization of the various machine operations has not been described, along with many other features which could be readily designed by a person skilled in the art. Whilst one particular embodiment has been described, it will be readily apparent to a person skilled in the art that many modifications or variations can be made without departing from the spirit and scope of the invention. For example, the number of singulation and orientation heads may be reduced in a smaller machine or increased if the machine is to be made larger. In its simplest form, the machine would comprise only one singulation and orientation head. Many other modifications can be readily envisaged.

Since modifications within the spirit and scope of the invention may be readily effected by persons skilled in the art, it is to be understood that the invention is not limited to the particular embodiment described, by way of example, hereinabove.

It will be understood that the invention disclosed and defined herein extends to all alternative combinations of two or more of the individual features mentioned or evident from the text or drawings. All of these different combinations constitute various alternative aspects of the invention.

It will also be understood that the term "comprises" or its grammatical variants as used herein is equivalent to the term "includes" and is not to be taken as excluding the presence of other elements or features.

We claim:

1. Apparatus for presenting a flexible article in a predetermined orientation, which article is longer than it is wider, the apparatus including:

an orientation head including means to tumble said article generally about one direction while retaining the article so that it can rotate about another direction while it is being tumbled;

retention means including a retentison face, moveable between a first position in which the retention face is disposed to receive said article generally downwardly from the orientation head while it is being tumbled thereby, and a second position displaced from the first;

means to detect when the article received on the retention face is correctly oriented on the retention face, in response to which detection the retention means moves to said second position; and means to receive said article in a predetermined orientation from the retention face at said second position of the retention means.

2. Apparatus according to claim 1 further including an input conveyor on which in use the articles are randomly oriented and picker means for selecting single articles in turn from the input conveyor, and delivering the selected article in turn to the orientation head.

3. Apparatus according to claim 2, wherein said picker means includes a picker nozzle and a chute, said picker nozzle being mounted on the end of a vacuum tube and adapted for movement to a position above and in close proximity to said input conveyor whereby a vacuum applied to said nozzle causes an article to be picked-up from said input conveyor and retained by said nozzle, said picker nozzle being adapted for further movement to a position clear of said input conveyor and over the chute such that removal of said nozzle vacuum causes said article to be released by said nozzle and dropped into or onto the chute, which is positioned to deliver an article therein to said orientation head.

4. Apparatus according to claim 2, wherein said apparatus comprises a plurality of said picker means and associated orientation heads arranged in spaced relation along said input conveyor.

5. Apparatus according to claim 2, wherein said input conveyor is part of a recirculation belt conveyor system onto which in use articles are loaded from bulk and on which articles not selected on a pass through said apparatus are recirculated.

6. Apparatus according to claim 1, wherein said retention face is defined by a flipper plate comprising an open frame.

7. Apparatus according to claim 6, wherein each said flipper plate is pivotally mounted in said apparatus, which further includes means to displace said flipper plate comprising a pneumatic actuator for pivoting said flipper plate from said first position to said second position, in which second position said retention face is substantially parallel to a surface of said means to receive said article from the retention face.

8. Apparatus according to claim 1, further including means to temporarily hold the article received from the orientation head on said retention face.

9. Apparatus according to claim 8, wherein said means to temporarily hold the article includes vacuum suction means.

10. Apparatus according to claim 1, wherein said means to receive said article from the retention face includes a pecking conveyor and an output conveyor.

11. Apparatus according to claim 10, wherein plurality of orientation units, each including said orientation head and said retention means, in arranged with respect to the pecking conveyor to form respective sub-stacks of the articles on the pecking conveyor in which sub-stacks the articles have an orientation pre-determined by the orientation units, and wherein the pecking conveyor is arranged and is relatively operable to feed the sub-stacks onto the output conveyor for delivery thereby to a packaging machine.

12. Apparatus according to claim 11, wherein said pecking conveyor is adapted to move transversely of a longitudinal direction of the output conveyor, and has a surface adapted to move transversely in order to deposit said sub-stacks of said articles deposited on said pecking conveyor, onto said output conveyor by a combination of transverse movement of the pecking conveyor and transverse movement of the surface thereof.

13. Apparatus according to claim 10, wherein said output conveyor receives said articles from said pecking conveyor in a stack and transports said stack to a hopper wherein the stack is prepared for packaging into a box.

14. Apparatus according to claim 1, wherein said orientation head includes a perforated orientation roller adapted to have a vacuum on the face of a sector of the roller, the vacuum being maintained in the same angular position as the roller rotates and said other direction being substantially radial with respect to the roller, whereby when said article is dropped onto said roller it is held by the rotating roller and tumbled about said one direction while rotating about said other direction until one end is held against the roller by the vacuum and the article depends downwardly.

15. Apparatus according to claim 14, wherein said retention means, in said first position extends downwardly from under said roller with said retention face at a slight angle to the vertical whereby said article rests in a downwardly oriented position against said retention face, and said detection means includes sensor means to determine when said article is fully extended.

16. Apparatus according to claim 14, wherein said perforated orientation roller is mounted to rotate on a stationary shaft, said shaft having an axial bore and an elongate radial slot extending from said bore through the surface of the shaft whereby vacuum applied to said bore is applied through the perforations of said roller as they align with said slot during rotation of the roller.

17. Apparatus according to claim 1, wherein said articles are non-uniformly shaped articles, such as rubber gloves.

18. An apparatus for facilitating layer packaging of flexible articles, including:
   an orientation head;
   picker means for selecting single articles, in turn, from an input conveyor and delivering said articles to said orientation head, said orientation head including a flipper plate and means to retain and tumble said article until said article is correctly oriented on the face of said flipper plate;
   means to hold said article temporarily on said face; and
   means to displace said flipper plate whereby said article is placed immediately above a pecking conveyor and released forms aid flipper plate to lie in a flat, oriented position, on said pecking conveyor.

19. Apparatus according to claim 18, wherein said pecker means includes a picker nozzle and a chute, said picker nozzle being mounted on the end of a vacuum tube and adapted for movement to a position above and in close proximity to said input conveyor whereby a vacuum applied to said nozzle causes an article to be picked-up from said input conveyor and retained by said nozzle, said picker nozzle being adapted for further movement to a position clear of said input conveyor and over the chute such that removal of said nozzle vacuum causes said article to be released by said nozzle and dropped into or onto the chute, which is positioned to deliver an article therein to said orientation head.

20. Apparatus according to claim 18, wherein said apparatus comprises a plurality of said picker means and associated orientation heads arranged in spaced relation along said input conveyor.

21. Apparatus according to claim 18, wherein said input conveyor is part of a recirculation belt conveyor system onto which in use articles are loaded from bulk and on which articles not selected on a pass through said apparatus are recirculated.

22. Apparatus according to claim 18, wherein each said flipper plate is pivotally mounted in said apparatus, which further includes means to displace said flipper plate comprising a pneumatic actuator for pivoting said flipper plate from a first position to a second position, in which second position said retention face is substantially parallel to a surface of said pecking conveyor to receive said article from the retention face.

23. Apparatus according to claim 18, wherein said means to temporarily hold the article includes vacuum suction means.

24. Apparatus according to claim 18, further including an output conveyor, wherein a plurality of orientation units each including said orientation head and said flipper plate is arranged with respect to the pecking conveyor to form respective sub-stacks of the articles on the pecking conveyor in which sub-stacks the articles have an orientation predetermined by the orientation units, and wherein the pecking conveyor is arranged and is relatively operable to feed the sub-stacks onto the output conveyor for delivery thereby to a packaging machine.

25. Apparatus according to claim 24, wherein said pecking conveyor is adapted to move transversely of a longitudinal direction of the output conveyor, and has a surface adapted to move transversely in order to deposit said sub-stacks of said articles deposited on said pecking conveyor, onto said output conveyor by a combination of transverse movement of the pecking conveyor and transverse movement of the surface thereof.

26. Apparatus according to claim 18, further including an output conveyor that receives said articles from said pecking conveyor in a stack and transports said stack to a hopper wherein the stack is prepared for packaging into a box.

27. Apparatus according to claim 18, wherein said orientation head includes a perforated orientation roller adapted to have a vacuum on the face of a sector of the roller, the vacuum being maintained in the same angular position as the roller rotates, whereby when said article is dropped onto said roller it is held by the rotating roller and tumbled about one direction of the roller while rotating about another direction substantially radial with respect to the roller until one end is held against the roller by the vacuum and the article depends downwardly.

28. Apparatus according to claim 27, wherein said perforated orientation roller is mounted to rotate on a stationary shaft, said shaft having an axial bore and an elongate radial slot extending from said bore through the surface of the shaft whereby vacuum applied to said bore is applied through the perforations of said roller as they align with said slot during rotation of the roller.

29. Apparatus according to claim 18, wherein said articles are non-uniformly shaped articles, such as rubber gloves.

* * * * *

UNITED STATES PATENT AND TRADEMARK OFFICE
CERTIFICATE OF CORRECTION

PATENT NO. : 5,924,547
DATED : 20 July 1999
INVENTOR(S) : McInnes et al.

It is certified that error appears in the above-identified patent and that said Letters Patent is hereby corrected as shown below:

Column 2, Line 58, delete "cute" and substitute -- chute -- therefor;
Column 3, Line 66, delete "piked" and substitute -- picked -- therefor Signed and Sealed this Twenty-fifth Day of January, 2000

Attest:

Attesting Officer

Acting Commissioner of Patents and Trademarks